(12) United States Patent
Huang et al.

(10) Patent No.: US 10,680,709 B2
(45) Date of Patent: Jun. 9, 2020

(54) DEBUGGING METHOD AND DEVICE FOR OPERATING POINT VOLTAGE OF PARALLEL MZI ELECTRO-OPTICALMODULATOR

(71) Applicant: Accelink Technologies Co., Ltd., Wuhan, Hubei (CN)

(72) Inventors: Zhao Huang, Wuhan (CN); Bo Zhang, Wuhan (CN); Kun Qian, Wuhan (CN); Yi Hu, Wuhan (CN); Weidong Ma, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 16/329,065

(22) PCT Filed: Dec. 19, 2016

(86) PCT No.: PCT/CN2016/110665
§ 371 (c)(1),
(2) Date: May 15, 2019

(87) PCT Pub. No.: WO2018/040383
PCT Pub. Date: Mar. 8, 2018

(65) Prior Publication Data
US 2019/0273558 A1    Sep. 5, 2019

(30) Foreign Application Priority Data
Aug. 31, 2016    (CN) .......................... 2016 1 0786072

(51) Int. Cl.
*H04B 10/079*    (2013.01)
*G02F 1/01*    (2006.01)
(Continued)

(52) U.S. Cl.
CPC ..... *H04B 10/07955* (2013.01); *G02F 1/0123* (2013.01); *G02F 1/21* (2013.01);
(Continued)

(58) Field of Classification Search
CPC ............ H04B 10/07955; H04B 10/079; H04B 10/548; H04B 10/516; H04B 10/556;
(Continued)

(56) References Cited

U.S. PATENT DOCUMENTS

| 6,721,081 B1* | 4/2004 | Mauro | .................. G02F 1/0123 359/239 |
| 8,095,018 B2* | 1/2012 | Sekine | .................. G02F 1/0123 398/157 |

(Continued)

FOREIGN PATENT DOCUMENTS

| CN | 103048810 A | 4/2013 |
| CN | 103684613 A | 3/2014 |

(Continued)

OTHER PUBLICATIONS

International Search Report PCT/CN2016/110665, dated May 19, 2017.

*Primary Examiner* — Abbas H Alagheband
(74) *Attorney, Agent, or Firm* — Lerner, David, Littenberg, Krumholz & Mentlik, LLP

(57) ABSTRACT

A debugging method and device for an operating point voltage of a parallel MZI electro-optical modulator. The parallel MZI electro-optical modulator comprises a Parent MZI (2) formed by a parallel connection of a Child MZI (3) in an I path and a Child MZI (4) in a Q path. The debugging method comprises: fixing a bias voltage of one Child MZI of the Child MZI (3) in the I path and the Child MZI (4) in the Q path; gradually adjusting a bias voltage of the other Child MZI, testing a parent extinction ratio PER of the Parent MZI (2) when different bias voltages are applied, and finding a corresponding bias voltage as an operating point voltage of the other Child MZI when the PER of the Parent MZI (2) reaches a minimum value, and then finding a corresponding bias voltage as an operating point voltage of the one Child (Continued)

MZI when the PER of the Parent MZI (2) reaches a minimum value; setting the bias voltages of two Child MZIs as operating point voltages corresponding to the two Child MZIs respectively, adjusting a phase modulation voltage of the Parent MZI (2) until the parallel MZI electro-optical modulator reaches an optimum output effect, and determining the phase modulation voltage of the Parent MZI (2). The method and device are simple; and the debugging process thereof is fast and efficient.

9 Claims, 4 Drawing Sheets

(51) Int. Cl.
*G02F 1/21* (2006.01)
*H04B 10/548* (2013.01)
*G02F 1/25* (2006.01)
*H04B 10/556* (2013.01)
*H04B 10/564* (2013.01)
*G02F 1/225* (2006.01)

(52) U.S. Cl.
CPC ......... *H04B 10/079* (2013.01); *H04B 10/548* (2013.01); *G02F 1/2255* (2013.01); *G02F 2001/212* (2013.01); *H04B 10/556* (2013.01); *H04B 10/564* (2013.01)

(58) Field of Classification Search
CPC ....... H04B 10/564; G02F 1/0123; G02F 1/21; G02F 2001/212; H04L 310/07955
USPC ........................................... 398/115, 38, 183
See application file for complete search history.

(56) References Cited

U.S. PATENT DOCUMENTS

| | | | |
|---|---|---|---|
| 10,097,277 B2* | 10/2018 | Zheng | H04B 10/07955 |
| 10,177,852 B2* | 1/2019 | Chen | H04B 10/556 |
| 10,509,243 B2* | 12/2019 | Rohde | H04B 10/50577 |
| 2004/0061922 A1* | 4/2004 | Mauro | G02F 1/0123 |
| | | | 359/279 |
| 2004/0090659 A1* | 5/2004 | Zhang | G02F 1/0123 |
| | | | 359/240 |
| 2006/0210210 A1* | 9/2006 | Webb | G02F 1/0123 |
| | | | 385/1 |
| 2008/0002991 A1* | 1/2008 | Masuda | H04B 10/505 |
| | | | 398/198 |
| 2008/0074722 A1* | 3/2008 | Kang | G02F 1/025 |
| | | | 359/240 |
| 2009/0103924 A1* | 4/2009 | Kawanishi | G02F 1/2255 |
| | | | 398/115 |
| 2010/0053732 A1* | 3/2010 | Kawanishi | G02F 1/353 |
| | | | 359/328 |
| 2012/0082465 A1* | 4/2012 | Akiyama | G02F 1/0123 |
| | | | 398/158 |
| 2014/0153077 A1* | 6/2014 | Kawakami | G02F 1/0123 |
| | | | 359/259 |
| 2016/0056896 A1* | 2/2016 | Toya | H04B 10/5053 |
| | | | 398/183 |
| 2016/0156418 A1* | 6/2016 | Yamanaka | H04B 10/564 |
| | | | 398/38 |
| 2018/0323878 A1* | 11/2018 | Kawakami | H04B 10/516 |

FOREIGN PATENT DOCUMENTS

| | | |
|---|---|---|
| CN | 104485997 A | 4/2015 |
| CN | 105515654 A | 4/2016 |
| CN | 105700202 A | 6/2016 |
| CN | 105871770 A | 8/2016 |

* cited by examiner

DEBUGGING METHOD AND DEVICE FOR OPERATING POINT VOLTAGE OF PARALLEL MZI ELECTRO-OPTICAL MODULATOR

TECHNICAL FIELD

The present disclosure relates to a debugging method and device for an optical communication component, and particularly, to a debugging method and device for an operating point voltage of a modulator, and more particularly, to a debugging method and device for an operating point voltage of a parallel MZI electro-optical modulator. The present disclosure belongs to the field of communication.

BACKGROUND

In order to realize massive high-speed ultra-long distance optical data communication, a coherent optical communication system based on optical phase modulation/demodulation has become one of mainstream solutions. At a transmitting terminal of the coherent optical communication system, a quadrature phase shift keying (QPSK) electro-optic modulator based on parallel Mach-Zehnder interferometer (MZI) structure has been widely used. A single MZI optical structure divides an input light into two paths of light which combine after being transmitted for a certain distance, and interference occurs. By changing the phase difference of the two paths of transmitting light from MZI through an applied voltage, the intensity and phase of an output light may be changed, and the MZI structure was widely favored in the field of electro-optic modulation devices due to this characteristic. A single MZI structure was biased to a non-light bias point where the output light intensity is the lowest, and then applied bias voltages with opposite polarities on its two arms, and the polarities of the bias voltages are periodically changed, so that a periodic optical signal with constant light intensity and a phase difference of 180° may be obtained and binary phase modulation of light (BPSK) may be formed. After the two MZIs are connected in parallel, the two paths of BPSK signals are orthogonally combined in a phase difference of 90° to obtain a QPSK signal. In 100G coherent optical communication, an in-phase and quadrature-phase (IQ) electro-optic modulator based on a parallel MZ structure is written into an international standard as a standard solution.

Before the parallel MZ electro-optic modulator is used, it is necessary to find an optimum operating point voltage of its bias voltage in order to make the modulator operate be in an optimum state. Fujitsu Company, a supplier of lithium niobate modulator, provides a debugging method for an operating point voltage of the lithium niobate modulator in its product specification, but this method is not suitable for debugging an operating point voltage of modulators made of all materials, such as a silicon-based electro-optic modulator biased by the thermo-optical effect. Due to the fact that the silicon optical modulator is biased by the thermo-optical effect, after a radio frequency (RF) signal is input, the RF energy loss generates heat, which makes the voltage of the operating point voltage of the modulator change, and it is difficult to adopt a method for finding the operating point voltage by a general lithium niobate modulator to debug the operating point voltage of the silicon optical modulator.

SUMMARY

The present disclosure overcomes the defects in the prior art and provides a debugging method and device for an operating point voltage of a parallel MZI electro-optical modulator, wherein the debugging method utilizes a simple device, and its debugging process is fast and efficient, and it may quickly find the operating voltage of the modulator.

The technical solution of the present disclosure is as follows:

A debugging method for an operating point voltage of a parallel MZI electro-optical modulator, the parallel MZI electro-optical modulator comprising a Parent MZI formed by a parallel connection of a Child MZI in an I path and a Child MZI in a Q path, the debugging method comprising: fixing a bias voltage of one Child MZI of the Child MZI in the I path and the Child MZI in the Q path; gradually adjusting a bias voltage of the other Child MZI, testing a parent extinction ratio (PER) of the Parent MZI when different bias voltages are applied, and finding a corresponding bias voltage as an operating point voltage of the other Child MZI when the PER of the Parent MZI reaches a minimum value; fixing the bias voltage of the other Child MZI for which the operating point voltage has been determined, gradually adjusting the bias voltage of the one Child MZI for which the operating point voltage has not yet to be determined and testing the PER of the Parent MZI when different bias voltages are applied, finding a corresponding bias voltage as an operating point voltage of the one Child MZI when the PER of the Parent MZI reaches a minimum value; and setting the bias voltages of two Child MZIs as the operating point voltages corresponding to the two Child MZIs respectively, adjusting a phase modulation voltage of the Parent MZI until the parallel MZI electro-optical modulator reaches an optimum output effect, thus determining the phase modulation voltage of the Parent MZI.

The method for measuring the PER of the Parent MZI when a different bias voltage is applied to a certain Child MZI comprises: gradually adjusting the phase modulation voltage of the Parent MZI, storing an optical power output of the parallel MZI electro-optical modulator corresponding to each phase modulation voltage, and determining the PER of the Parent MZI from difference between an obtained maximum optical power and an obtained minimum optical power.

The method for adjusting a phase modulation voltage of the Parent MZI until the parallel MZI electro-optical modulator reaches an optimum output effect comprises: adjusting the phase modulation voltage of the Parent MZI, and adjusting an optical eye diagram for outputting an output signal of the parallel MZI electro-optical modulator to a desired eye diagram shape.

The parallel MZI electro-optical modulator comprises a Parent MZI formed by a parallel connection of a Child MZI in an I path and a Child MZI in a Q path, the method comprising the following steps: step 1, adding a RF signal with a fixed signal frequency and a fixed amplitude on both of the Child MZI in the I path and the Child MZI in the Q path of the parallel MZI electro-optical modulator; step 2, applying a constant bias voltage to a phase-adjustment electrode of the Child MZI in the Q path/I path; step 3, applying different bias voltages on the Child MZI in the I path/Q path, adjusting a phase modulation voltage of the Parent MZI, storing an optical power output value of the parallel MZI electro-optical modulator under each phase modulation voltage of the Parent MZI, and calculating difference between a maximum optical power value and a minimum optical power value in the optical power output value to determine a parent extinction ratio PER of the Parent MZI; step 4, determining the bias voltage of the Child MZI in the I path/Q path corresponding to the minimum value of the PER of the Parent MZI as an operating point voltage Vi/Vq of the Child MZI in the I path/Q path; step 5, applying a constant bias voltage to a phase-adjustment electrode of the Child MZI in the I path/Q path, referring to the modes of step 3 and step 4, applying different bias voltages on the Child MZI in the Q path/I path, determining an operating point voltage Vq/Vi of the Child MZI in the Q path/I path; and step 6, setting the bias voltage of the I path as Vi, setting the bias voltage of the Q path as Vq, adjusting the phase modulation voltage of the Parent MZI, adjusting an output optical eye diagram to a standard QPSK eye diagram shape, and recording the phase modulation voltage V-90 of the Parent MZI at this time.

The step 5 specifically comprises: step 5-1, applying a RF signal with a fixed signal frequency and a fixed amplitude on both of the Child MZI in the I path and the Child MZI in the Q path of the parallel MZI electro-optical modulator; step 5-2, applying a constant bias voltage to the phase-adjustment electrode of the Child MZI in the I path/Q path; step 5-3, applying different bias voltages on the Child MZI in the Q path/I path, adjusting the phase modulation voltage of the Parent MZI, storing the optical power output value of the parallel MZI electro-optical modulator under each phase-adjustment electrode voltage of the Parent MZI, and calculating the difference between the maximum optical power value and the minimum optical power value in the optical power output values to determine the PER of the Parent MZI; step 5-4, determining the bias voltage of the Child MZI in the Q path/I path corresponding to the minimum value of the PER of the Parent MZI as the operating point voltage Vq/Vi of the Child MZI in the Q path/I path.

The method for determining a number of times that a voltage is applied on a Child MZI in a single path of the parallel MZI electro-optical modulator comprises: setting initial values of a DC bias half-wave voltage Vpi–b of a Child MZI, a scanning step Vstepb, and a voltage of a single path Vwork, calculating a scanning number Nb from Nb=2*Vpi–b/Vstepb, and applying different bias voltages to a single path of Child MZI for Nb times.

The method for determining a number of times that voltage is applied on the Parent MZI comprises: setting initial values of a phase modulation voltage Vp of the Parent MZI, a DC bias half-wave voltage Vpi–p of the Parent MZI, a scanning step Vstep, calculating a scanning number N from N=2*Vpi–p/Vstep, and applying different bias voltages to the Parent MZI for N times.

Entering step 7 after the step 6: correspondingly loading the determined working voltages Vi, Vq, V-90 on three bias electrodes of the Child MZI in the I path, the Child MZI in the Q path, the Parent MZI of the parallel MZI electro-optical modulator, to enable the parallel MZI electro-optical modulator to normally output a standard QPSK signal.

A debugging device for an operating point voltage of a parallel MZI electro-optical modulator, the parallel MZI electro-optical modulator comprising a mother MZI formed by a parallel connection of a Child MZI in an I path and a Child MZI in a Q path, the debugging device comprising: a tunable laser, a polarization controller, a parallel MZI electro-optical modulator, a pattern generator, a RF driver, an optical sampling oscilloscope, a multi-channel DC power supply, a 1×2 coupler, a low-speed optical power meter, wherein light output by the tunable laser passes through the polarization controller and enters the parallel MZI electro-optical modulator in an optimal polarization state, a RF electrical signal output by the pattern generator is respectively loaded on the Child MZI in the I path and the Child MZI in the Q path of the parallel MZI electro-optical modulator after amplified by the RF Driver, a synchronous clock signal output by the pattern generator is input to a sampling port of the optical sampling oscilloscope, a DC bias voltage of the parallel MZI electro-optical modulator is provided by the multi-path DC power supply, and an optical signal output by the parallel MZI electro-optical modulator passes through the 1×2 coupler, and respectively enters the optical sampling oscilloscope and the low-speed optical power meter.

The present disclosure has the following advantages:

1. The present disclosure only adopts a manner of monitoring optical power to find the operating point of modulator, and does not involve complicated feedback circuit design, such that the debugging device is simple, and the debugging process is fast and efficient;

2. Compared with the debugging method for the operating point of lithium niobate IQ modulator provided by Fujitsu Company, the method provided by the present disclosure is suitable for debugging the operating point of parallel MZI modulator of all material systems;

3. The present disclosure is suitable for manually debugging a modulator in a laboratory, and may also realize debugging an operating point in the production process of ultra-large batch of modulators by programming.

REFERENCE SIGNS

1 Optical input terminal;
2 Parent MZI;
3 Child MZI in an I path;
4 Child MZI in a Q path;
5 Phase-adjustment electrode of I path;
6 Phase-adjustment electrode of Q path;
7 Phase-adjustment electrode of Parent MZI;
8 Optical output terminal;
9 RF electrode of I path;
10 RF electrode of Q path;
11 Tunable laser;
12 Polarization controller;
13 IQ electro-optical modulator;
14 1×2 coupler;
15 Optical sampling oscilloscope;
16 Low-speed optical power meter;
17 pattern generator (with synchronous clock);

18 RF Driver;
19 Multi-channel DC power supply

DESCRIPTION OF EMBODIMENTS

The debugging method for an operating point voltage of a parallel MZI electro-optical modulator in the present disclosure will be described in detail below with reference to embodiments and drawings.

Figure 1:
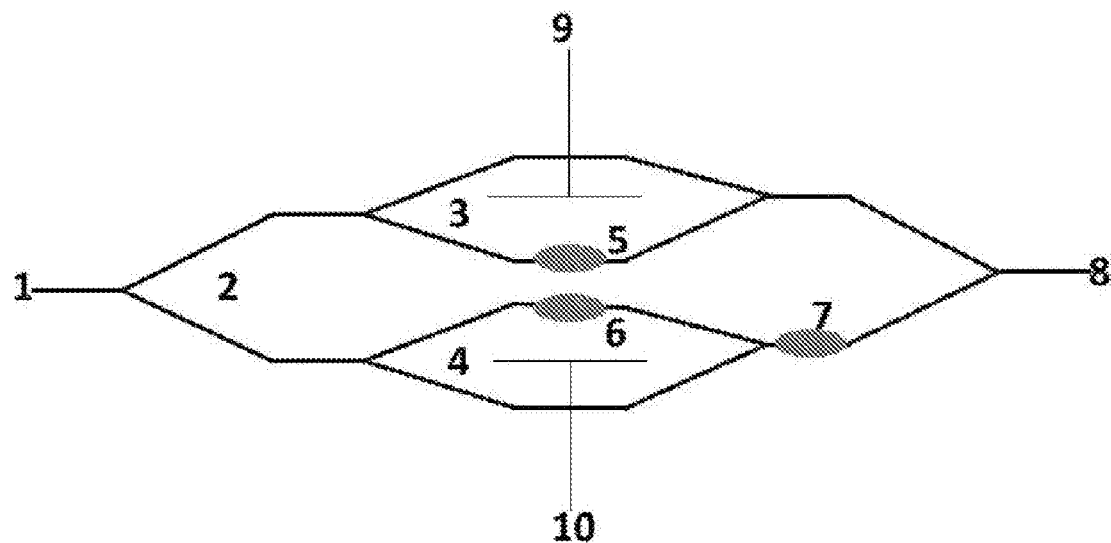
FIG. 1 is a structural schematic diagram of a parallel MZI electro-optical modulator according to the present disclosure.

FIG. 1 is a structural schematic diagram of a parallel MZI electro-optical modulator. A parallel MZI is a Parent MZI_2 formed by connecting two sub-MZIs (a Child MZI_3 in an I path, a Child MZI_4 in a Q path) in parallel. A phase-adjustment electrode 5 of I path, a phase-adjustment electrode 6 of Q path and a phase-adjustment electrode 7 of the Parent MZI are respectively fabricated on the optical paths of the Child MZI_3 in the I path, the Child MZI_4 in the Q path and the Parent MZI_2. ARF signal is respectively loaded on the Child MZI_3 in the I path and the Child MZI_4 in the Q path through a traveling wave electrode (RF electrode of I path) 9 and a traveling wave electrode (RF electrode of Q path) 10. A light source enters the parallel MZI structure from an optical input terminal 1. A suitable bias voltage is applied to the Child MZI_3 in the I path, the Child MZI_4 in the Q path and the Parent MZI_2 through the phase-adjustment electrode 5 of I path, the phase-adjustment electrode 6 of Q path and the phase-adjustment electrode 7 of the Parent MZI, and a high-speed electrical signal is loaded respectively on two Child MZIs (the Child MZI_3 in the I path and the Child MZI_4 in the Q path) by the traveling wave electrode (the RF electrode of I path) 9 and the traveling wave electrode (the RF electrode of Q path) 10 and modulates light, and the modulated optical signal is output by an output terminal 8.

Figure 2:
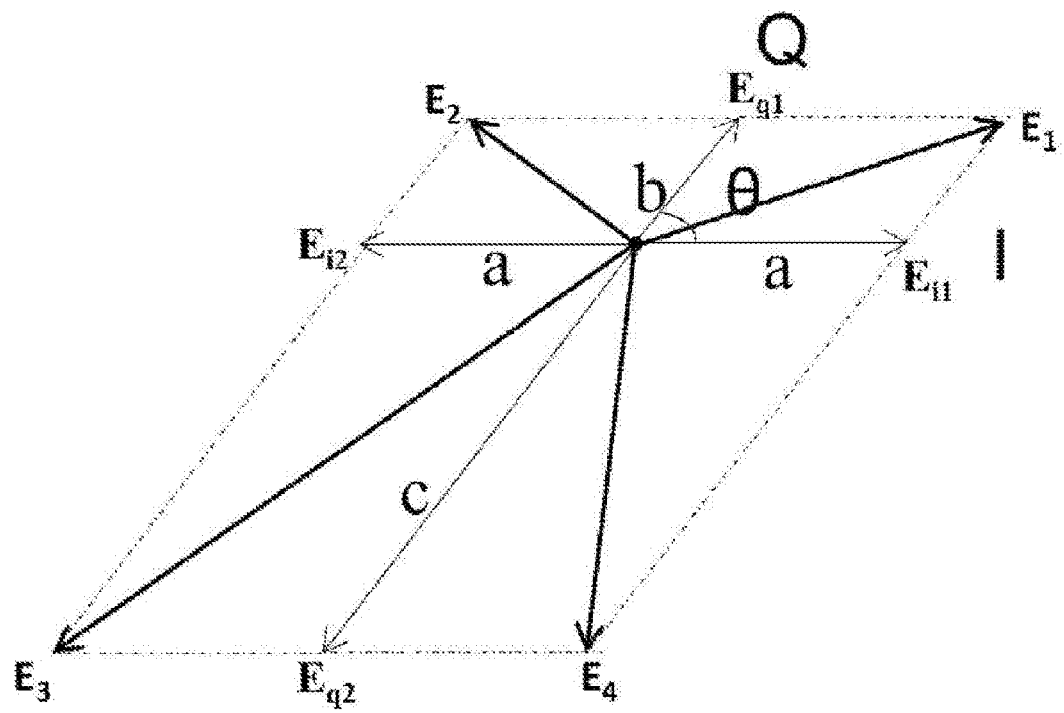
FIG. 2 is a vector superposition diagram of electric field of I path and Q path in a case where the I path according to the present disclosure is BPSK (two state electric fields of the Q path are in the same direction)
Figure 3:
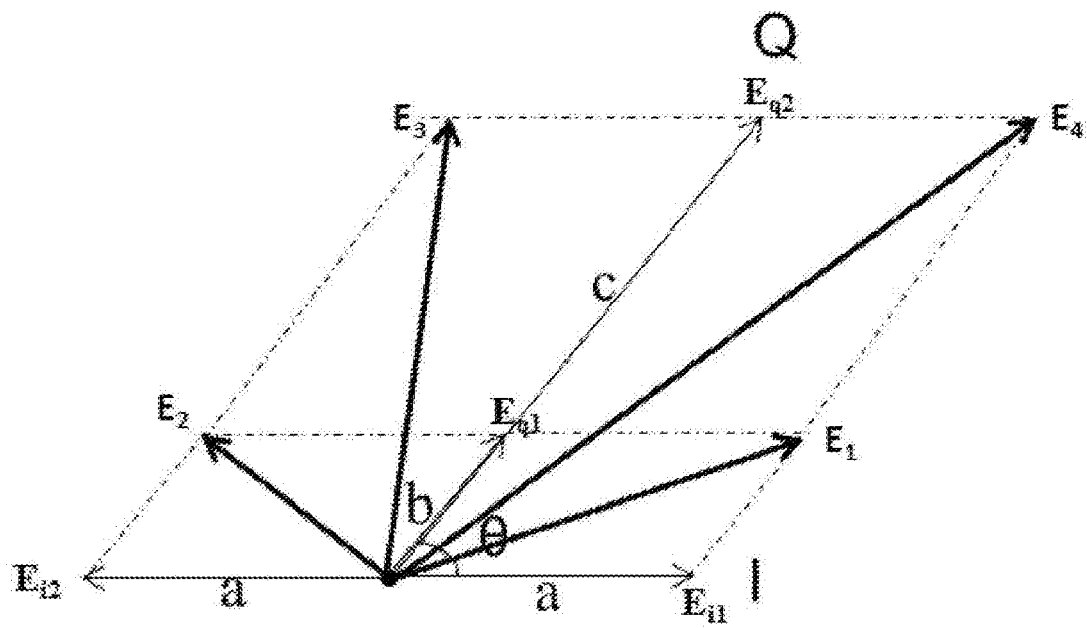
FIG. 3 is a vector superposition diagram of electric field of I path and Q path in a case where the I path according to the present disclosure is BPSK (two state electric fields of the Q path are in the opposite direction)

As shown in FIGS. 2 and 3, a pseudo-random RF signal loaded on the I path causes an electric field output by the Child MZI_3 in the I path to be Ei1 and Ei2; a pseudo-random RF signal is loaded on the Q path causes an electric field output by the Child MZI_4 in the Q path to be Eq1 and Eq2, and phase difference between the I path and the Q path is θ, every two of the electric fields of the I path and the Q path are superposed as E1, E2, E3 and E4, and these four electric fields appear with equal probability (p=¼) in time domain. Considering the case where a bias voltage of the I path is already at the operating point (BPSK point), at this time, the modulus of the electric fields Ei1=Ei2=a, Eq1=b, and Eq2=c. The average light intensity output from the output terminal 8 is measured by a low-speed optical power meter whose rate is much lower than a RF signal rate:

$$I = \frac{E1^2 + E2^2 + E3^2 + E4^2}{4}$$

$$= \frac{(a^2 + b^2 + 2ab \cos \theta) + (a^2 + b^2 - 2ab \cos \theta) +}{4}$$
$$\phantom{=} \frac{(a^2 + c^2 + 2ac \cos \theta) + (a^2 + c^2 - 2ac \cos \theta)}{4}$$

$$= a^2 + \frac{b^2 + c^2}{2}$$

It can be seen from the above results that when the I path is adjusted to a BPSK state, the average optical power output by the modulator is independent of the phase difference θ between the I path and the Q path; at this time, no matter how to adjust the voltage of the phase-adjustment electrode 7, the average optical power is constant and the average optical power parent extinction ratio is 0; based on the above inference, the present disclosure provides a debugging method and device for an operating point voltage of a parallel MZI electro-optical modulator, which may quickly and effectively determine the bias voltage corresponding to the minimum value of the average optical power parent extinction ratio of the modulator.

Figure 4:
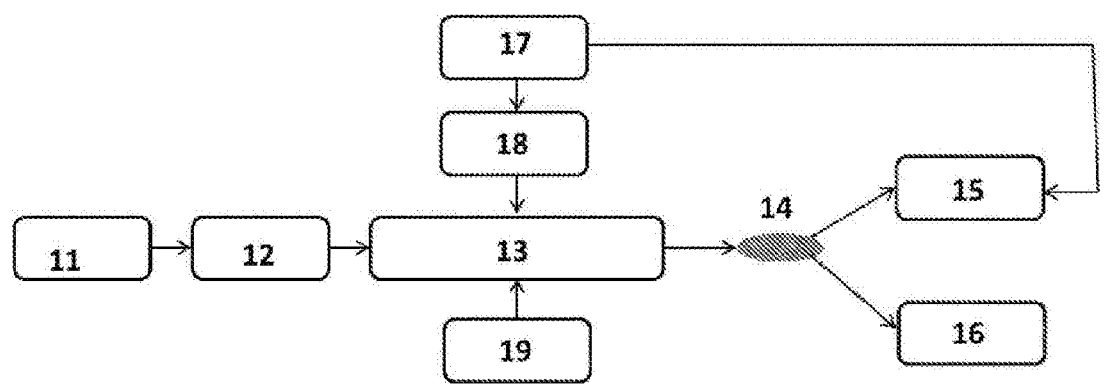
FIG. 4 is a connection diagram of debugging device for an operating point voltage of a modulator according to the present disclosure.

FIG. 4 is a connection diagram of a debugging device for an operating point voltage of a parallel MZI electro-optical modulator, wherein light output from a tunable laser 11 passes through a polarization controller 12 and enters a parallel MZI-type IQ electro-optical modulator 13 in an optimal polarization state; a RF electrical signal output by a pattern generator 17 with synchronous clock is amplified by a RF driver 18 and then loaded on an I path and a Q path of the IQ electro-optical modulator 13; a synchronous clock signal output by the pattern generator 17 is input to a sampling port of an optical sampling oscilloscope 15; a DC bias voltage of the IQ electro-optical modulator 13 is provided by a multi-path DC power supply 19, and an output optical signal of the IQ electro-optic modulator 13 passes through a 1×2 coupler 14, and enters an optical sampling oscilloscope 15 and a low-speed optical power meter 16, respectively.

Figure 5:
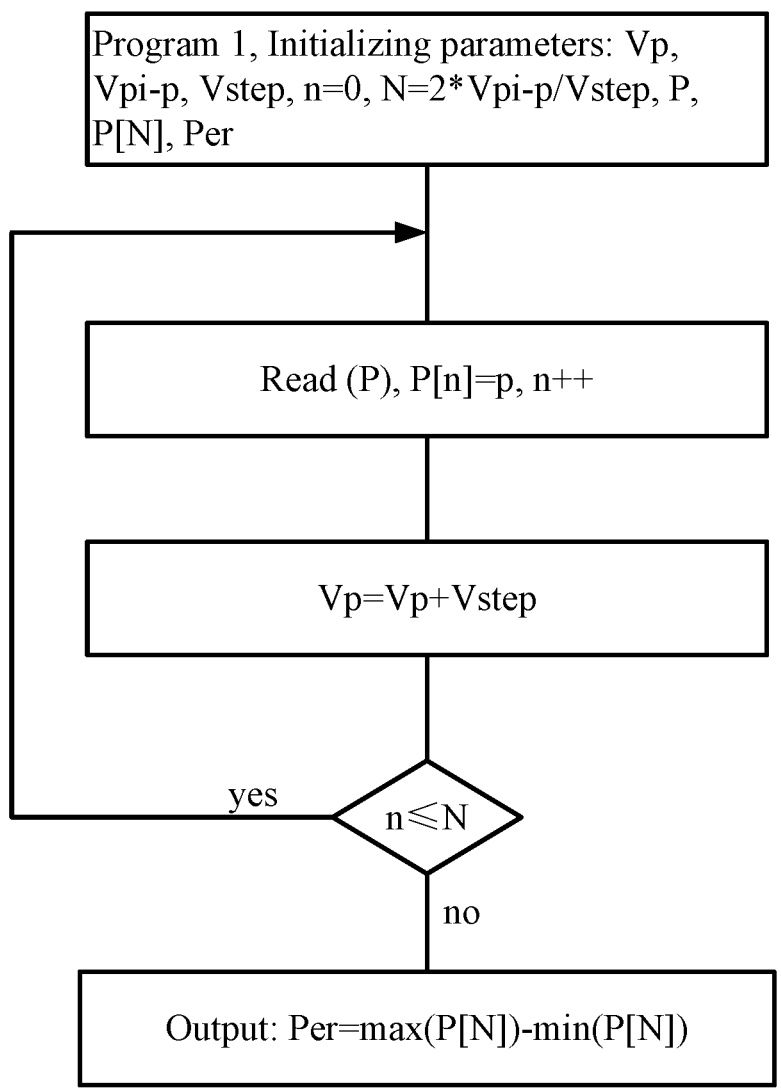
FIG. 5 is a program block diagram for automatically measuring an average optical power parent extinction ratio of a Parent MZI according to the present disclosure.
Figure 6:
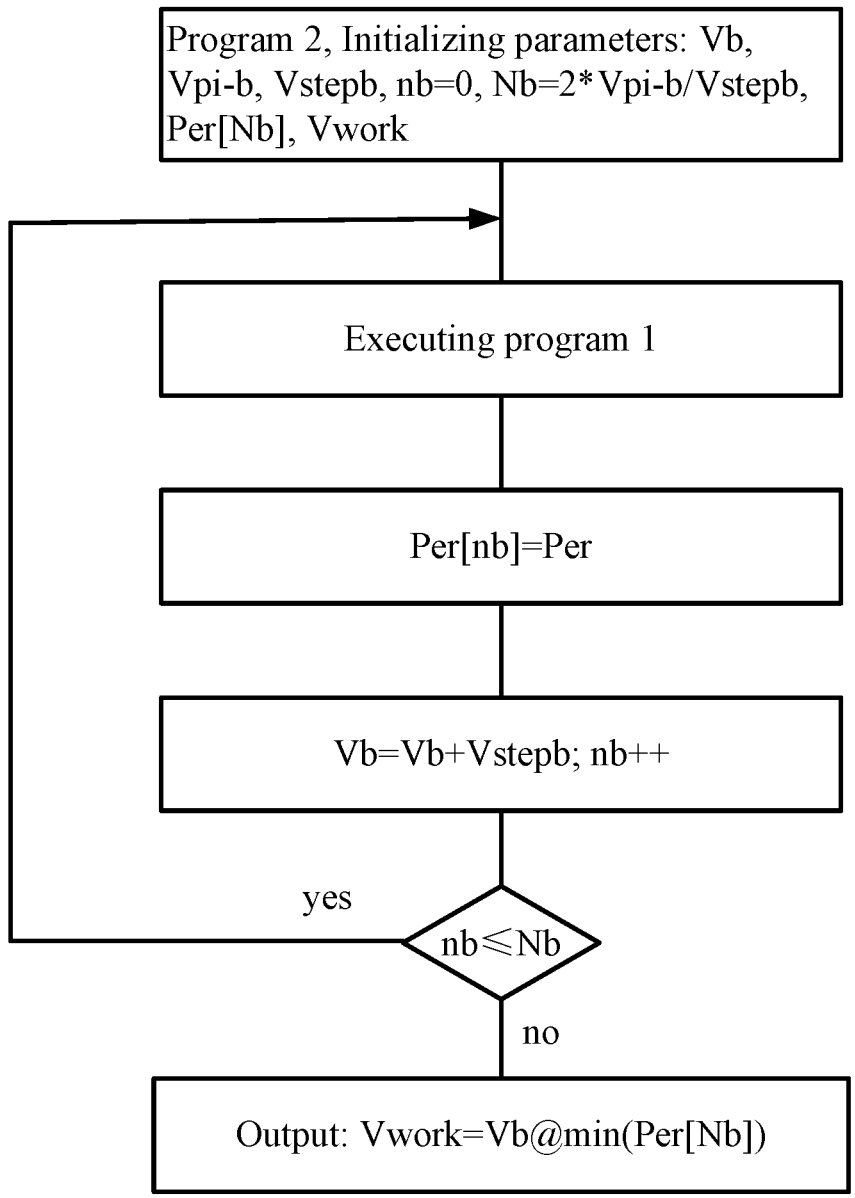
FIG. 6 is a program block diagram for automatically finding an operating point voltage of a single path according to the present disclosure.

The present disclosure also provides a debugging method for an operating point voltage of a parallel MZI electro-optical modulator, the debugging method comprising:

step 1, adding a RF signal with a fixed signal frequency and a fixed amplitude output by a pattern generator 17 to both of an I path and a Q path of a parallel MZI-type IQ electro-optical modulator 13;

step 2, applying a certain constant DC bias voltage provided by a multi-channel DC power supply 19 to a phase-adjustment electrode of a Child MZI in a Q path of the IQ electro-optic modulator 13, such that the Child MZI in the Q path is in an initial state;

step 3, testing a parent extinction ratio PER of a Parent MZI under different bias voltages of I path when a bias voltage Vb is applied to a Child MZI in a single path of the I path, measuring an average optical power parent extinction ratio of the Parent MZI by adjusting a phase-adjustment electrode of the Parent MZI, and obtaining the corresponding average optical power PER of the Parent MZI; FIG. 5 is a program block diagram for automatically measuring the average optical power parent extinction ratio of the Parent MZI, and the specific process comprises: setting initial values to the following parameters: a phase modulation voltage Vp of the Parent MZI, a DC bias half-wave voltage Vpi–p of the Parent MZI, a scanning step Vstep, a counting parameter n where its initial value is set to 0, an optical power P, an optical power storage array P[N], a parent extinction ratio PER; obtaining a scanning number N=2*Vpi–p/Vstep from the phase modulation voltage Vp of the Parent MZI, the DC bias half-wave voltage Vpi–p of the Parent MZI, and the scanning step Vstep; incrementally increasing the phase modulation voltage Vp of the Parent MZI, and reading an optical power meter reading P and writing the same into the optical power storage array P[N] each time the phase modulation voltage is increased (i.e. Vp=Vp+Vstep), until the scanning is completed; selecting a maximum optical power max(P[N]) and a minimum optical power min(P[N]) stored in the optical power storage array, calculating difference between the maximum optical power and the minimum optical power in P[N] (dB is as a unit), this value is the PER of the Parent MZI when the bias voltage Vb is applied on the Child MZI in the single path;

step 4, incrementally increasing the phase modulation voltage Vb applied on the Child MZI in the single path of the I path, and each time the phase modulation voltage is increased, operating the program 1 in step 3 to calculate the corresponding PER and then writing into a parent extinction ratio storage array PER[Nb] until the scanning is completed; selecting a bias voltage corresponding to the minimum parent extinction ratio in PER[Nb] as an operating voltage of the path, an output working voltage in the program being (Vwork of I path=Vi, Vwork of Q path=Vq); finding the bias voltage of the I path corresponding to the minimum PER, i.e. an operating point voltage Vi of the I path; FIG. 6 shows a program block diagram for automatically finding an operating point voltage of a single path;

step 5, due to the symmetry between the I path and the Q path, finding the operating point voltage Vq of the Q path according to the method principle of steps 1 to 4; the specific process comprises:

step 5-1, adding a RF signal with a fixed signal frequency and a fixed amplitude on both of I path and Q path of the parallel MZI-type IQ electro-optic modulator 13;

step 5-2, applying a constant bias voltage to the phase-adjustment electrode of the Child MZI in the I path, this bias voltage being the operating point voltage Vi of the I path determined in step 4;

step 5-3, testing the PER of the Parent MZI under different bias voltages of Q path, storing the optical power output value under each phase modulation voltage by adjusting the phase-adjustment electrode voltage of the Parent MZI, and calculating difference between a maximum optical power and a minimum optical power to obtain the PER of the Parent MZI;

Step 5-4, finding the bias voltage corresponding to the minimum PER of the Parent MZI, and determining the operating point voltage Vq of the Q path;

step 6, setting the bias voltage of the I path as Vi, the bias voltage of the Q path as Vq, adjusting the phase modulation voltage of the Parent MZI, adjusting an optical eye diagram output by the optical sampling oscilloscope 15 to a standard QPSK (Quadrature Phase Shift Keying) eye diagram shape, and recording the phase modulation voltage V-90 of the Parent MZI at this time;

step 7, determining the working voltages Vi, Vq, V-90 from the above steps, and correspondingly loading these three voltages on three bias electrodes of the parallel MZI-type IQ electro-optical modulator 13, i.e. the phase-adjustment electrode 5 of the I path, the phase-adjustment electrode 6 of the Q path, the phase-adjustment electrode 7 of the Parent MZI, then the parallel MZI-type IQ electro-optic modulator 13 may normally output a standard QPSK signal.

The above method is illustrated by a mode of firstly determining the operating point voltage Vi applied on the MZI in the I path, those skilled in the art should understand that it may also firstly determine the operating point voltage Vq applied on the MZI in the Q path, and then determine the operating point voltage Vi applied on the MZI in the I path.

The debugging method for an operating point voltage of a parallel MZI electro-optical modulator provided by the present disclosure is suitable for debugging the operating point of parallel MZI modulator of all material types. The debugging device is simple, and the debugging process is fast and efficient, which is suitable for manually debugging a modulator in a laboratory, and may also realize debugging of an operating point in the ultra-large batch production process of a modulator through programming.

Although the present invention has been illustrated and described in detail by reference to specific embodiments, it will be apparent to those skilled in the art that upon reading and understanding this specification and the drawings thereof, without departing from the spirit and scope of the present disclosure, particularly the functions implemented by the above apparatus, various changes may be made in the form and details of the apparatus. All of these changes will fall within the scope of protection as claimed in the claims of the present disclosure.

What is claimed is:

1. A debugging method for an operating point voltage of a parallel MZI electro-optical modulator, the parallel MZI electro-optical modulator comprising a Parent MZI formed by a parallel connection of a Child MZI in an I path and a Child MZI in a Q path, characterized in the debugging method comprising:

fixing a bias voltage of one Child MZI of the Child MZI in the I path and the Child MZI in the Q path;

gradually adjusting a bias voltage of the other Child MZI, testing a parent extinction ratio (PER) of the Parent MZI when different bias voltages are applied, and finding a corresponding bias voltage as an operating point voltage of the other Child MZI when the PER of the Parent MZI reaches a minimum value;

fixing the bias voltage of the other Child MZI for which the operating point voltage has been determined, gradually adjusting the bias voltage of the one Child MZI for which the operating point voltage has not yet to be determined and testing the PER of the Parent MZI when different bias voltages are applied, finding a corresponding bias voltage as an operating point voltage of the one Child MZI when the PER of the Parent MZI reaches a minimum value; and setting the bias voltages of two Child MZIs as the operating point voltages corresponding to the two Child MZIs respectively, adjusting a phase modulation voltage of the Parent MZI until an output effect of the parallel MZI electro-optical modulator reaches an optimum, thus determining the phase modulation voltage of the Parent MZI.

2. The debugging method for the operating point voltage of the parallel MZI electro-optical modulator of claim 1, characterized in that the method for measuring the PER of the Parent MZI when applying a different bias voltage to one Child MZI comprises: gradually adjusting the phase modulation voltage of the Parent MZI, storing an optical power output value of the parallel MZI electro-optical modulator corresponding to each phase modulation voltage, and determining the PER of the Parent MZI through difference between an obtained maximum optical power and an obtained minimum optical power.

3. The debugging method for the operating point voltage of the parallel MZI electro-optical modulator of claim 2, characterized in that the method for adjusting a phase modulation voltage of the Parent MZI until the parallel MZI electro-optical modulator reaches an optimum output effect comprises: adjusting the phase modulation voltage of the Parent MZI, and adjusting an optical eye diagram outputting an output signal of the parallel MZI electro-optical modulator to a desired eye diagram shape.

4. A debugging method for an operating point voltage of a parallel MZI electro-optical modulator, the parallel MZI electro-optical modulator comprising a Parent MZI formed by a parallel connection of a Child MZI in an I path and a Child MZI in a Q path, characterized in the method comprising:

step 1, adding a RF signal with a fixed signal frequency and a fixed amplitude on both of the Child MZI in the I path and the Child MZI in the Q path of the parallel MZI electro-optical modulator;

step 2, applying a constant bias voltage to a phase-adjustment electrode of the Child MZI in the Q path/I path;

step 3, applying different bias voltages on the Child MZI in the I path/Q path, adjusting a phase modulation voltage of the Parent MZI, storing an optical power output value of the parallel MZI electro-optical modulator under each phase modulation voltage of the Parent MZI, and calculating difference between a maximum optical power value and a minimum optical power value in the optical power output value to determine a parent extinction ratio PER of the Parent MZI;

step 4, determining the bias voltage of the Child MZI in the I path/Q path corresponding to the minimum value of the PER of the Parent MZI as an operating point voltage Vi/Vq of the Child MZI in the I path/Q path;

step 5, applying a constant bias voltage to a phase-adjustment electrode of the Child MZI in the I path/Q path, referring to the modes of step 3 and step 4, applying different bias voltages on the Child MZI in the Q path/I path, determining an operating point voltage Vq/Vi of the Child MZI in the Q path/I path; and step 6, setting the bias voltage of the I path as Vi, setting the bias voltage of the Q path as Vq, adjusting the phase modulation voltage of the Parent MZI, adjusting an output optical eye diagram to a standard QPSK eye diagram shape, and recording the phase modulation voltage V−90 of the Parent MZI at this time.

5. The debugging method for the operating point voltage of the parallel MZI electro-optical modulator of claim 4, characterized in that the step 5 specifically comprises: step 5-1, adding a RF signal with a fixed signal frequency and a fixed amplitude on both of the Child MZI in the I path and the Child MZI in the Q path of the parallel MZI electro-optical modulator; step 5-2, applying a constant bias voltage to the phase-adjustment electrode of the Child MZI in the I path/Q path; step 5-3, applying different bias voltages on the Child MZI in the Q path/I path, adjusting the phase modulation voltage of the Parent MZI, storing an optical power output value of the parallel MZI electro-optical modulator under each phase-adjustment electrode voltage of the Parent MZI, and calculating difference between a maximum optical power value and a minimum optical power value in the optical power output value to determine the PER of the Parent MZI; step 5-4, determining the bias voltage of the Child MZI in the Q path/I path corresponding to the minimum value of the PER of the Parent MZI as the operating point voltage Vq/Vi of the Child MZI in the Q path/I path.

6. The debugging method for the operating point voltage of the parallel MZI electro-optical modulator of claim 5, characterized in that the method for determining a number of times that a voltage is applied on a Child MZI in a single path of the parallel MZI electro-optical modulator comprises: setting initial values of a DC bias half-wave voltage Vpi−b of a Child MZI, a scanning step Vstepb, and a voltage of a single path Vwork, calculating a scanning number Nb from Nb=2*Vpi−b/Vstepb, and applying different bias voltages to a Child MZI in a single path for Nb times.

7. The debugging method for the operating point voltage of the parallel MZI electro-optical modulator of claim 5, characterized in that the method for determining a number of times that a voltage is applied on the Parent MZI comprises: setting initial values of a phase modulation voltage Vp of the Parent MZI, a DC bias half-wave voltage Vpi−p of the Parent MZI, a scanning step Vstep, calculating a scanning number N from N=2*Vpi−p/Vstep, and applying different bias voltages to the Parent MZI for N times.

8. The debugging method for the operating point voltage of the parallel MZI electro-optical modulator of claim 5, characterized in entering step 7 after the step 6: correspondingly loading the determined working voltages Vi, Vq, V−90 on three bias electrodes of the Child MZI in the I path, the Child MZI in the Q path, the Parent MZI of the parallel MZI electro-optical modulator, to enable the parallel MZI electro-optical modulator to normally output a standard QPSK signal.

9. A debugging device for an operating point voltage of a parallel MZI electro-optical modulator, the parallel MZI electro-optical modulator comprising a Parent MZI formed by a parallel connection of a Child MZI in an I path and a Child MZI in a Q path, characterized in the debugging device comprising: a tunable laser, a polarization controller, a parallel MZI electro-optical modulator, a pattern generator, a RF driver, an optical sampling oscilloscope, a multi-channel DC power supply, a 1×2 coupler, a low-speed optical power meter, wherein light output by the tunable laser passes through the polarization controller and enters the parallel MZI electro-optic modulator in an optimal polarization state, a RF electrical signal output by the pattern generator are loaded on the Child MZI in the I path and the Child MZI in the Q path of the parallel MZI electro-optical modulator after amplified by the RF Driver, a synchronous clock signal output by the pattern generator is input to a sampling port of the optical sampling oscilloscope, a DC bias voltage of the parallel MZI electro-optical modulator is provided by the multi-channel DC power supply, and an output optical signal of the parallel MZI electro-optical modulator passes through the 1×2 coupler, and enters the optical sampling oscilloscope and the low-speed optical power meter, respectively.

* * * * *